J. P. BROPHY.
DRIVING MECHANISM FOR AUTOMATIC MACHINES.
APPLICATION FILED OCT. 19, 1916.
1,389,433.
Patented Aug. 30, 1921.
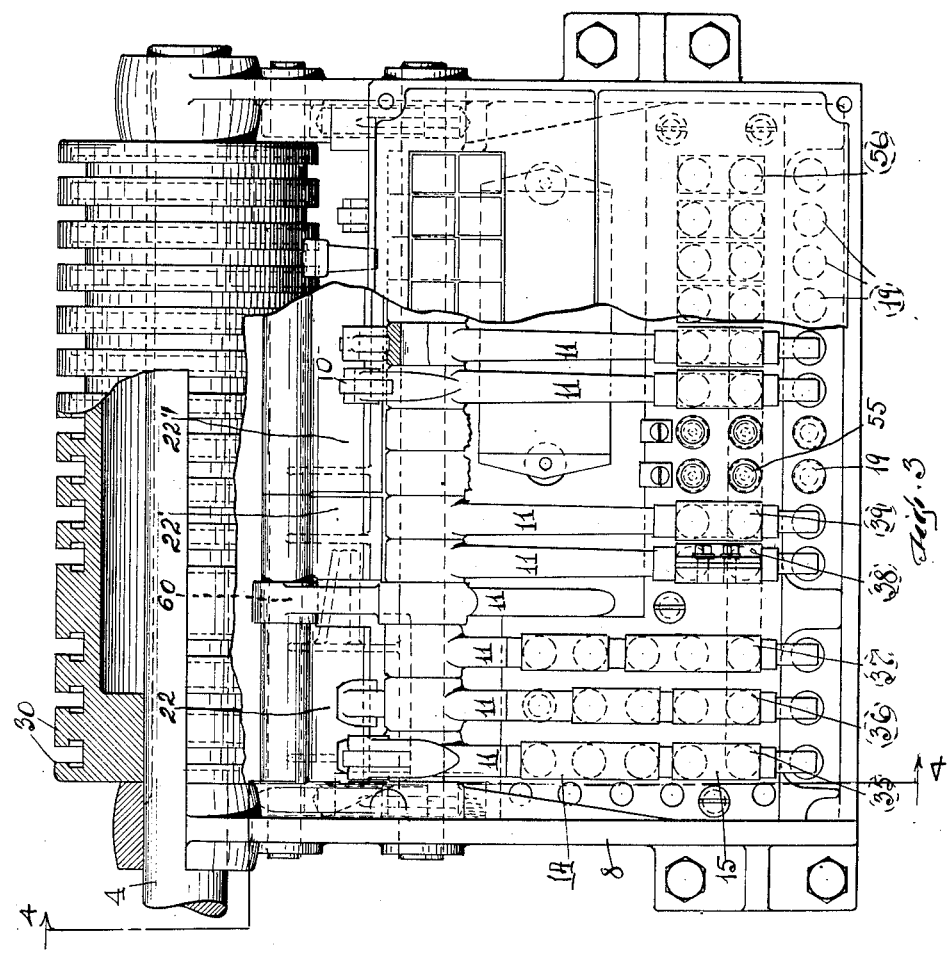
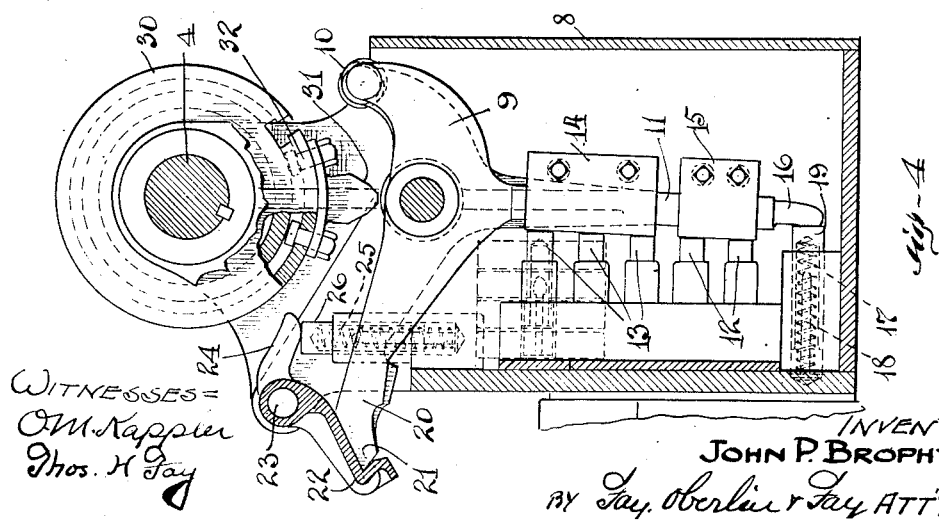
WITNESSES:
O. M. Kappler
Thos. H. Fay
INVENTOR
JOHN P. BROPHY
BY Fay, Oberlin & Fay ATTYS

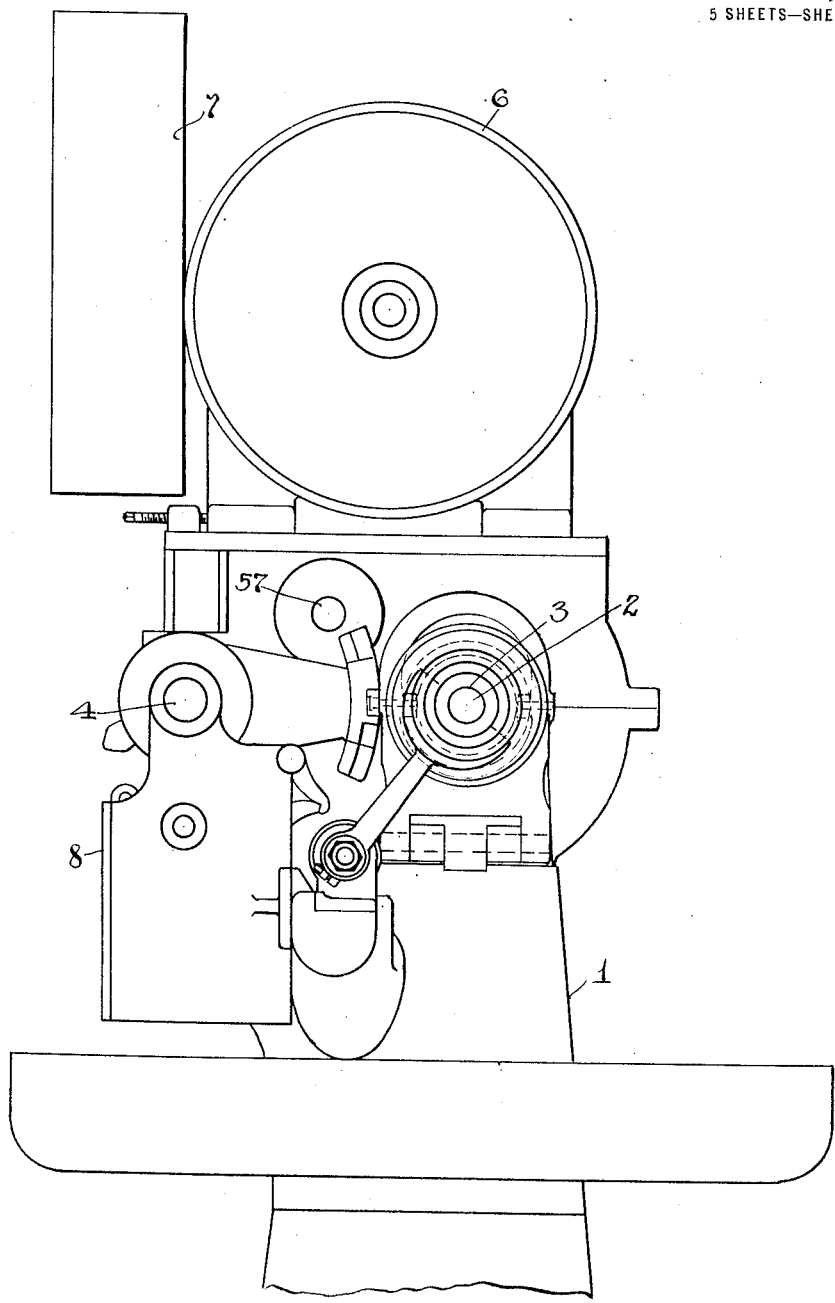

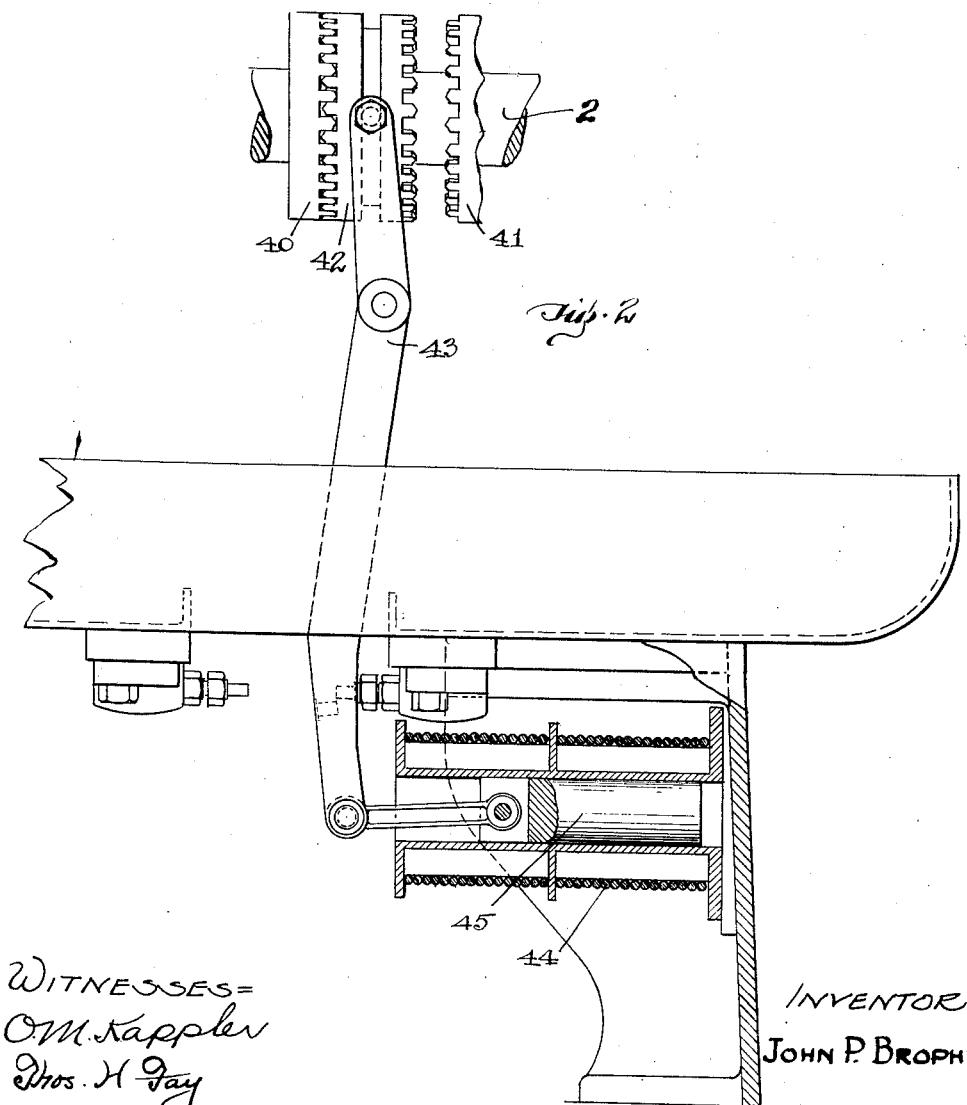

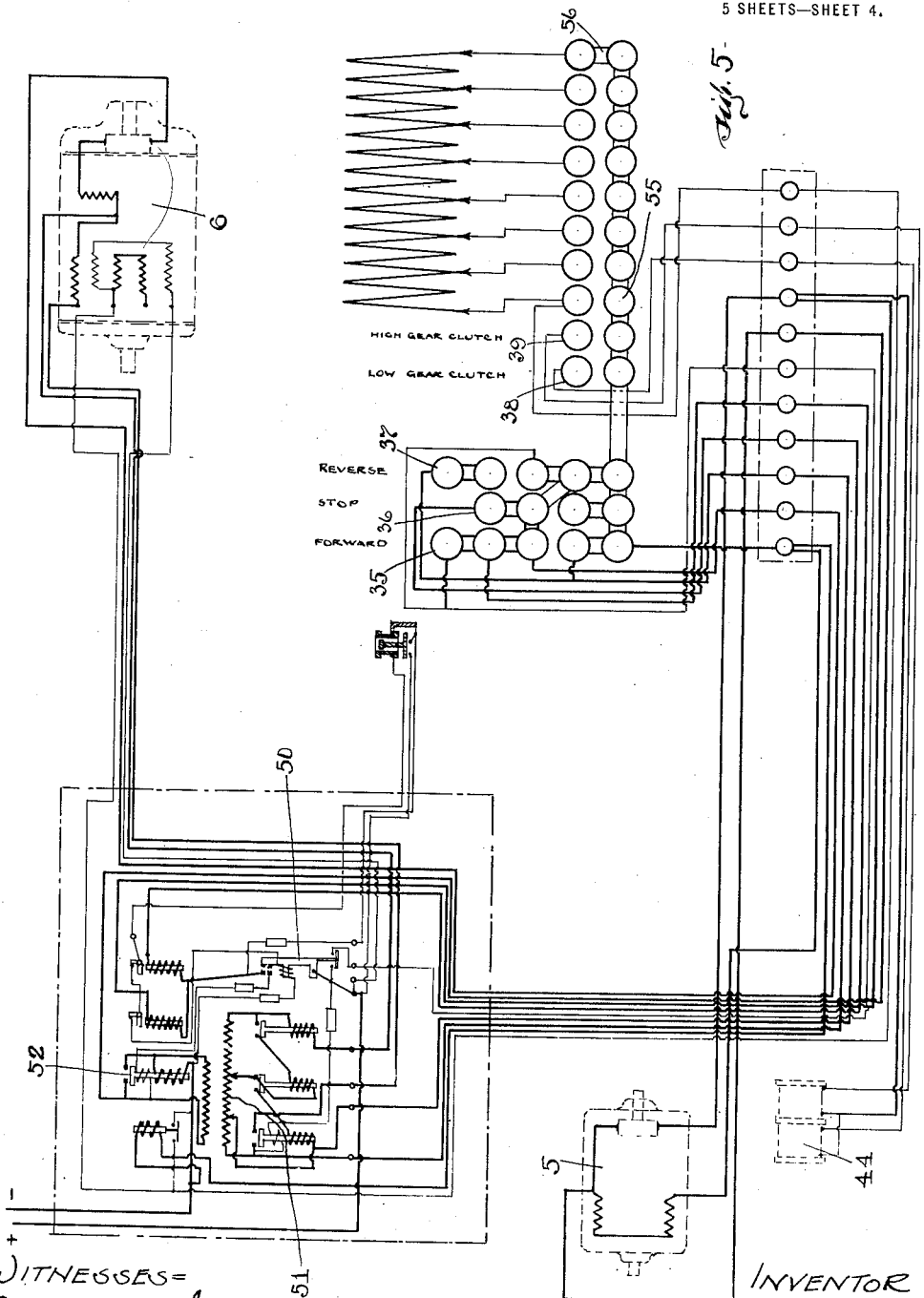

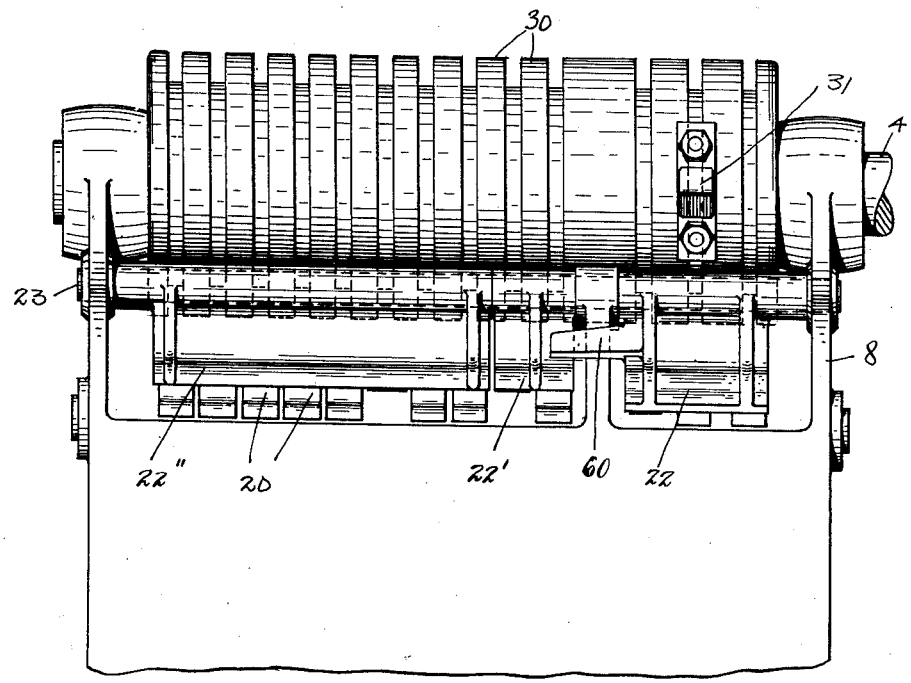

UNITED STATES PATENT OFFICE.

JOHN P. BROPHY, OF CLEVELAND, OHIO.

DRIVING MECHANISM FOR AUTOMATIC MACHINES.

1,389,433.  Specification of Letters Patent.  Patented Aug. 30, 1921.

Application filed October 19, 1916. Serial No. 126,543.

*To all whom it may concern:*

Be it known that I, JOHN P. BROPHY, a citizen of the United States, and a resident of Cleveland, county of Cuyahoga, and State of Ohio, have invented a new and useful Improvement in Driving Mechanism for Automatic Machines, of which the following is a specification, the principle of the invention being herein explained and the best mode in which I have contemplated applying that principle, so as to distinguish it from other inventions.

The present invention relating, as indicated, to automatic machines has more particular regard to a machine in which a number of different operations can be carried on on a single blank or piece of stock. In such machines it is of prime importance to be able to change operations and to move cutting tools into and away from operating positions at high speed, although many of the operations must necessarily be carried out at a relatively low speed. In the ordinary machines the range of work spindle speeds is not sufficient to obtain the correct speed of rotation to suit different diameter and kinds of stock. It is one subject of the present invention to provide a means for automatically varying the speed of the machine in accordance with the operations which are being performed, thus making it possible to use a relatively high speed during the returning movement of the tools or the blank, while the actual cutting speed can be estimated to correspond with the exact operation which is being performed. To the accomplishment of the foregoing and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Figure 1 is an end elevation of an automatic lathe embodying the present invention; Fig. 2 is a view partially in section showing the high and low gear clutches and the operating means for the same; Fig. 3 is a side elevation of the speed controlling means with a portion of the side cover-plate broken away to show the interior mecha- nism; Fig. 4 is a section on the line 4—4 in Fig. 3; Fig. 5 is a diagrammatic view showing the connections of the electrical system; and Fig. 6 is a side elevation of the speed controlling means looking at the same from the side opposite to that shown in Fig. 3.

Referring to Fig. 1, showing an end view of a lathe, there is shown a base or framework 1 in which is mounted the main spindle 2, which is preferably hollow to receive a bar of stock 3. Since the present invention may be applied to various types of machines I have not shown the present lathe in detail and it will be understood that any machine carrying out more than a single operation on a piece of stock can be constructed in accordance with the present invention. In the lathe here shown there is disposed a cam shaft 4 preferably parallel with and at about the same level as the tool spindle. This cam shaft being driven by any desirable means and at a relatively constant speed. I have shown (see Fig. 5) an electric motor 5 as being the preferred driving means for the cam shaft. Along the cam shaft 4 there may be mounted the usual cams for electrically or mechanically throwing into or out of operation through suitable mechanism the various tools and producing the various movements of spindle and turret, and these cams, which are not shown in the present drawings, may be of the usual or any desired type. Mounted upon one end of the framework 1 is a variable speed motor 6, which is connected in any suitable manner to a driving shaft 57, this driving shaft being connected to the tool spindle 2 for driving purposes, and forming an independent and variable speed-driving means for the tool spindle. Mounted alongside of the motor, or in any other convenient position, is a panel box 7 containing switches and rheostats which will be described hereinafter.

Mounted below the cam shaft 4 is a casing or controller box 8 in which there are disposed a plurality of parallel pivoted rocker arms or switches 9. A side elevation of one of these switches is shown in Fig. 4, and consists of a roller or stud 10, mounted upon a laterally extending portion and having a downwardly extending arm or switch member 11 adapted in the position shown in this figure to close circuits through contacts 12 and 13 by means of blocks 14 and 15, which are movably attached to this arm 11. The lower end 16 of this arm 11 is adapted in the position shown in this figure to compress a spring 17, which is disposed about a rod 18 and within a cylindrical chamber or casing 19 engaged by the end 16 upon its movement into the position shown in Fig. 4. This spring 17 when thus compressed serves to incidentally disengage the switch member 11 from the contacts 12 and 13 when the mechanical means for the switch member are released. This member 9 is also formed with another arm 20 extending oppositely from the stud or roller 10 and terminating in a point 21 adapted to be engaged in a latch member 22 pivoted about an axis 23 and normally held in a position to be engaged about this point 21 by a spring plunger 26 acting upon an extending dog 24. Each arm 20 automatically releases any other arm 20 as it is raised to the latch 22, this being accomplished by the fact that cam 31 raises arm 20 somewhat higher than the normal latched position, thus releasing any arm 20 previously engaged in latch 22. When this dog 24 is depressed it compresses the spring 25 operating in a cylinder 26, which serves to at once return the latch 22 to its normal position as soon as the arm 20 is no longer actuated by cam 31 through the medium of roller 10 and arm 9, also serving to securely hold latch 22 in engagement with the end 21 of the switch member. Mounted on the cam shaft 4 are a series of spaced parallel disks 30, each of these disks being of T shape, as shown in Fig. 3, and adapted to have inserted therebetween cam members 31, which are bolted in position by T bolts 32 engaging behind the flanges or sides of the extending part of the T. This cam 31 is operated in a counter-clockwise direction (looking at Fig. 4) and will thus strike the stud 10 to swing the member into a circuit closing position against the contacts 12 and 13. When thrown into this position the end of the switch member engages in the latch 22, which serves to hold the switch closed until another cam 31 has rotated into contact with another arm 9 which will then raise the latch 22 higher than its normal latched position, thus releasing the last previously engaged arm 20.

There are three latch members 22, 22' and 22", as shown in Fig. 6. The latch member 22 extends across and controls the operation of the forward switch 35, the stop switch 36 and the reverse switch 37 and prevents the operative engagement of more than one of these switches at a time. The latch 22' extends across the switch members 38 and 39, controlling the engagement of the low gear and high gear clutches, respectively, and allows engagement of but one of these switches at a time. The latch 22" extends across all of the other switch members 11, controlling the cutting in of the various amounts of resistance to vary the speed of the motor, and since this switch prevents the engagement of more than one of the switches 11 at one time, eight different amounts of resistance may be separately cut into the motor circuit, and therefore eight different speeds can be obtained. Extending laterally from the latch 22 is an arm 60, which lies in the operative path of movement of the latch 22'. By means of this lost motion connection or stop between the latches 22 and 22', the latch 22' is prevented from acting to release either the high or low gear clutch without also raising the latch 22 and disengaging whichever one of the switch 35, 36 or 37 may at the time be engaged. On the other hand, any one of these three switches 35, 36 or 37 may be independently operated without in turn operating the low and high gear clutches, since movement of the latch 22 does not operate the latch 22'. The operation of the various parts of the controlling mechanism are clear from the foregoing description. Any different amount of resistance may be included in the motor circuit by the operation of a suitable cam, as already described, without affecting the high and low gear clutches, or the forward stop or reverse switches. Similarly, either the stop or forward switches may be operated without affecting the amount of resistance in the motor circuit or the engagement of the high or low gear clutches. On the other hand, if either the high or low gear clutches are actuated, all of the three switches 35, 36 and 37 are simultaneously disengaged and must be reëngaged by a differently positioned cam after the operation of whichever one of the two clutches 38 or 39 has been thrown in.

The switch members 9, shown in Fig. 3, serve to throw in to the circuit of the motor 6 additional amounts of resistance which cause a variation in the speed of the motor and also to make connections which will effect stopping, starting and reversing of the motor. The switch members 35, 36 and 37 are not switches controlling the resistance units, the switch 35 being the starting switch for the motor for the purpose of producing rotation of same in a forward direction, and the switch 37 serving to reverse the direction of rotation of the motor when in circuit. The switch 36 serves to short circuit the motor to stop the same.

The switches 38 and 39 serve to engage the low or high gear clutches 40 and 41 with a shifting collar 42 provided over the side with clutch members (see Fig. 2). In this way a mechanical change of speed is obtained for the spindle, and thus for every speed of the motor there are two speeds available at the spindle. Operation of the clutch member 42 is effected by a lever 43 operated by a double acting solenoid 44 controlling an armature 45 connected to the lever 43. The energizing of the two ends of the solenoid are effected by the switches 38 and 39.

I have not shown the two speed connections from the clutch members 40 and 41 to the spindle since these may be of any desired type and are not uncommon in such lathes. It will be obvious that a three or more speed mechanism may be substituted for the two speed device here referred to, if additional speeds are desired at the spindle.

Referring to Fig. 5, showing the electrical connections, the variable speed motor 6 is illustrated as being a shunt wound motor having two interpole windings, one of which is continuous, and the other an extra or intermittent winding. A panel box 7 contains the main switch 50, along with the usual starting rheostats 51 for both the variable speed motor and the constant speed motor 5 where such a device is used to drive the cam shaft. Besides the rheostats there are the usual over-load circuit breakers 52 to protect the two motors.

In operation the main switch 50 will first be closed, starting the constant speed motor 5 which drives the cam shaft 4 by which are operated the cams for controlling the speeds of the variable speed motor. On the drawing there are the three positions, "forward," "stop" and "reverse", only one of which will be connected at a time, which is giving the usual motor connections for the main variable speed motor.

In the motor controller box 8 there are shown thirteen contacts, or switches, 11, of which two are adapted to control the low gear clutch and the high gear clutch, as already explained. These two clutches are electrically operated by the solenoid 44 so that the gear shifting is accomplished automatically.

To gain the various speeds desired for the motor 6, there are eight contact points which control the amount of resistance in the shunt field circuit of the variable speed motor. The wiring diagram shows one of the usual methods for placing the resistance in circuit as desired, and it will be noticed that when the circuit is closed from the contact 55 there will be no resistance in series with the shunt field which gives the slowest motor speed possible. As the circuit is made through the other contact points, the resistance will be gradually cut into the shunt field of the motor, thus gradually increasing the speed. At contact point 56 all the resistance will be in and the intermittent or extra interpole winding will be cut out of circuit, leaving only the main interpole winding operative.

In this way there are shown the possible eight motor speeds besides the two speeds given by the low and high gear ratios, thus giving the total of 16 speeds forward and reverse, which can be used as is found desirable. As the wiring diagram shows the usual controller, panel box, and wiring connections, it is thought unnecessary to describe the wiring diagram in detail, as this is only one of the number of controllers which might be used.

The contact marked "stop" merely short circuits the main or variable speed motor through a resistance to act as a brake on the motor and bring it to a quick stop, thus enabling the device to be shifted from forward to reverse in the least possible time. By use of the interpole windings, the sparking is kept down to a minimum on the motor, so that the speeds can be changed very rapidly. The interpole windings also make it possible to shift from any speed to any other desired speed without coming down through all the contact points.

The advantages of my improved lathe are the greater speed of operation, and the better results that can be secured by a more careful selection of speed for each operation. The number of speeds can be multiplied, of course, by changing the motor construction, and also by the use of additional speed changes in the mechanical drive from the motor to the spindle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the class described, the combination of a constant speed cam shaft, a spindle, a variable speed motor, a mechanical two-speed transmission means connecting said motor and said spindle, and means operable by said cam shaft and adapted to automatically engage either of the two speeds in said transmission means.

2. In a machine of the class described, the combination of a constant speed cam shaft, a spindle, a variable speed motor, a mechanical two-speed transmission means connecting said motor and said spindle, means operable by said cam shaft and adapted to vary the speed of said motor, and other means also operable by said cam shaft and adapted to engage either of the two speeds in said transmission means.

3. In a machine of the class described, the combination of a constant speed cam shaft, a spindle, a variable speed motor, a mechanical two-speed transmission means connecting said motor and said spindle, a clutch adapted to engage either of the two speeds in said transmission means, a double acting solenoid connected to operate said clutch, and means operable by said cam shaft and adapted to operate said solenoid.

4. In a machine of the class described, the combination of a constant speed cam shaft, a spindle, a variable speed motor, a mechanical two-speed transmission means connecting said motor and said spindle, a clutch adapted to engage either of the two speeds in said transmission means, a double acting solenoid connected to operate said clutch, and means automatically operable by said cam shaft and adapted to vary the speed of said motor and to operate said solenoid.

5. In a machine of the class described, the combination of a constant speed cam shaft, a spindle, a variable speed motor, a mechanical two-speed transmission means connecting said motor and said spindle, a clutch adapted to engage either of the two speeds in said transmission means, a double acting solenoid connected to operate said clutch, a plurality of resistance elements normally disconnected from the circuit of said variable speed motor, a plurality of switch members, one of said switch members controlling the connection of said resistance elements in the circuit of said motor, and the other of said switch members controlling the closing of the circuit through said solenoid, and means operable by said cam shaft for actuating said switches.

6. In a machine of the class described, the combination of a constant speed cam shaft, a spindle, a variable speed motor, a mechanical two-speed transmission means connecting said motor and said spindle, a clutch adapted to engage either of the two speeds in said transmission means, a double acting solenoid connected to operate said clutch, a plurality of resistance elements normally disconnected from the circuit of said variable speed motor, a plurality of switch members, one of said switch members controlling the connection of said resistance elements in the circuit of said motor, and the other of said switch members controlling the closing of the circuit through said solenoid, and a plurality of cams mounted on said cam shaft and adapted to actuate said switches to close the same.

7. In a machine of the class described, the combination of a constant speed cam shaft, a spindle, a variable speed motor, two-speed transmission means connecting said motor and said spindle, a clutch adapted to engage either of the two speeds in said transmission means, a double acting solenoid connected to operate said clutch, a plurality of resistance elements normally disconnected from the circuit of said variable speed motor, a plurality of switch members, one of said switch members controlling the connection of said resistance elements in the circuit of said motor, and the other of said switch members controlling the closing of the circuit through said solenoid, a plurality of spaced drums mounted on said cam shaft, and a plurality of cams adjustably mounted between said drums, said cams being adapted to actuate said switch members.

Signed by me, this 18 day of October, 1916.

JOHN P. BROPHY.

Attested by:—
J. F. BURGESS,
W. M. DALEY.